Dec. 25, 1951 T. C. MASCARO 2,580,236
TURF PENETRATING MACHINE AND ELEMENT THEREFOR
Filed Oct. 9, 1947 4 Sheets-Sheet 3
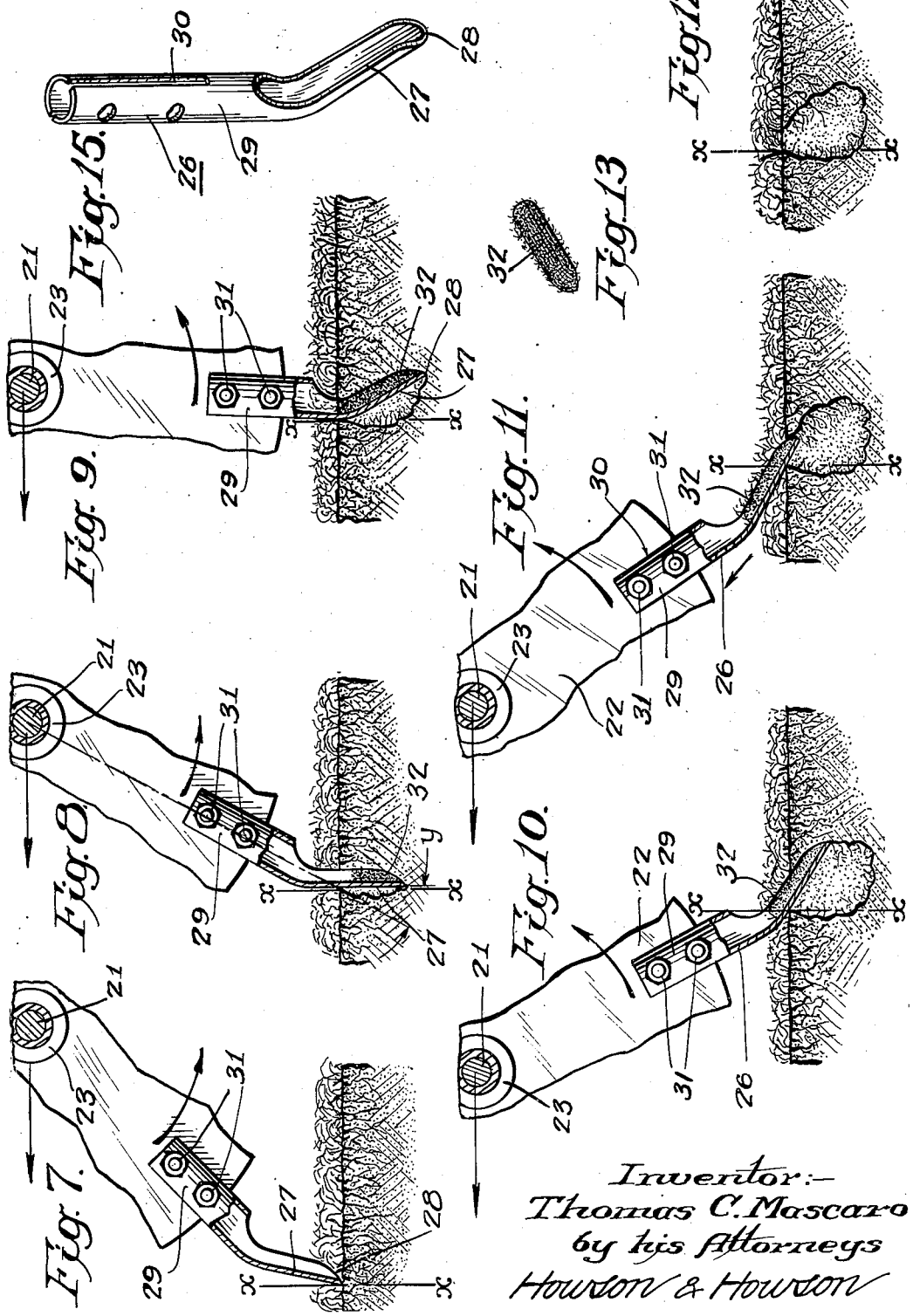
Inventor:—
Thomas C. Mascaro
by his Attorneys
Howson & Howson Dec. 25, 1951 — T. C. MASCARO — 2,580,236
TURF PENETRATING MACHINE AND ELEMENT THEREFOR
Filed Oct. 9, 1947 — 4 Sheets-Sheet 4

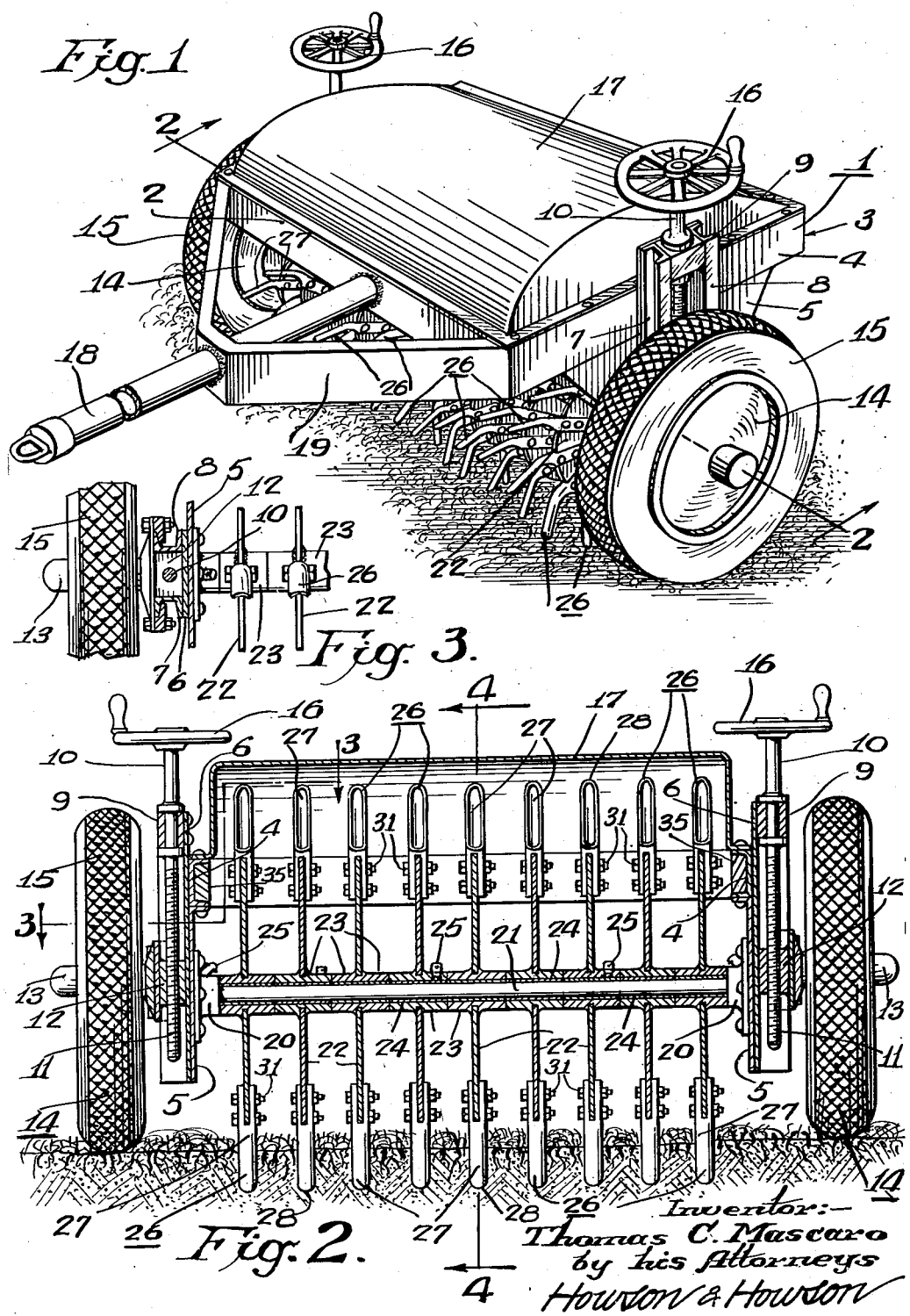

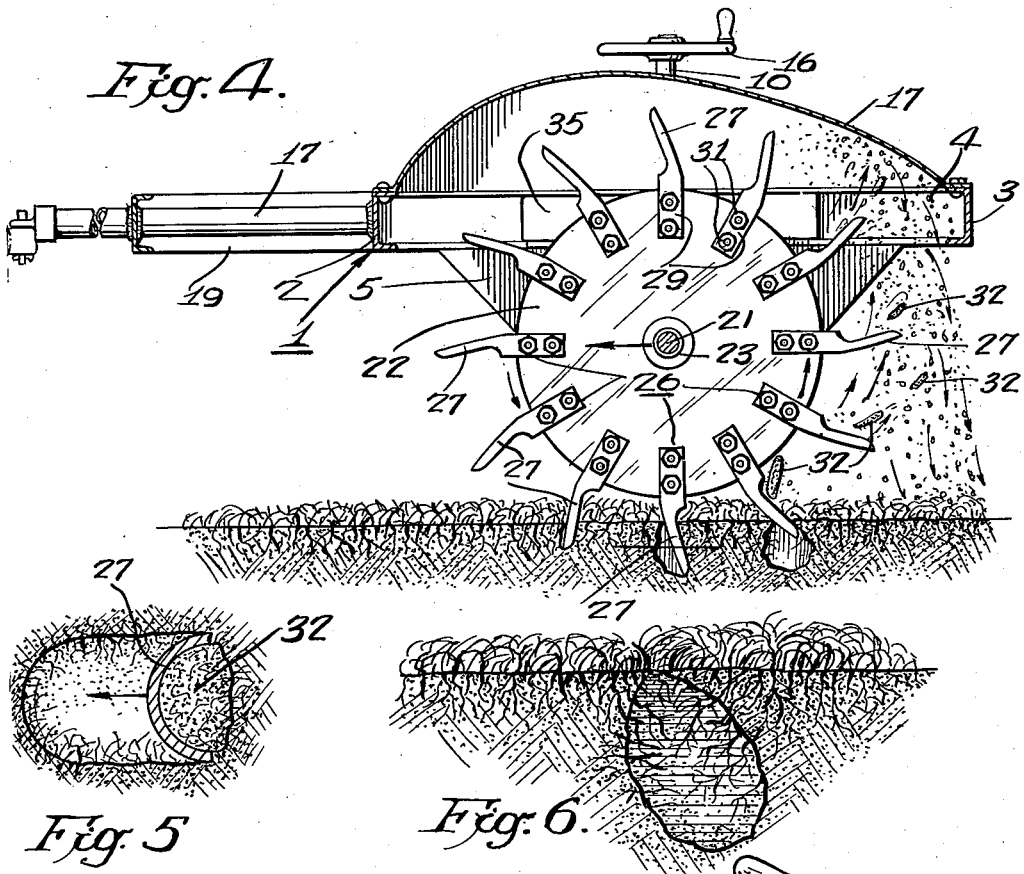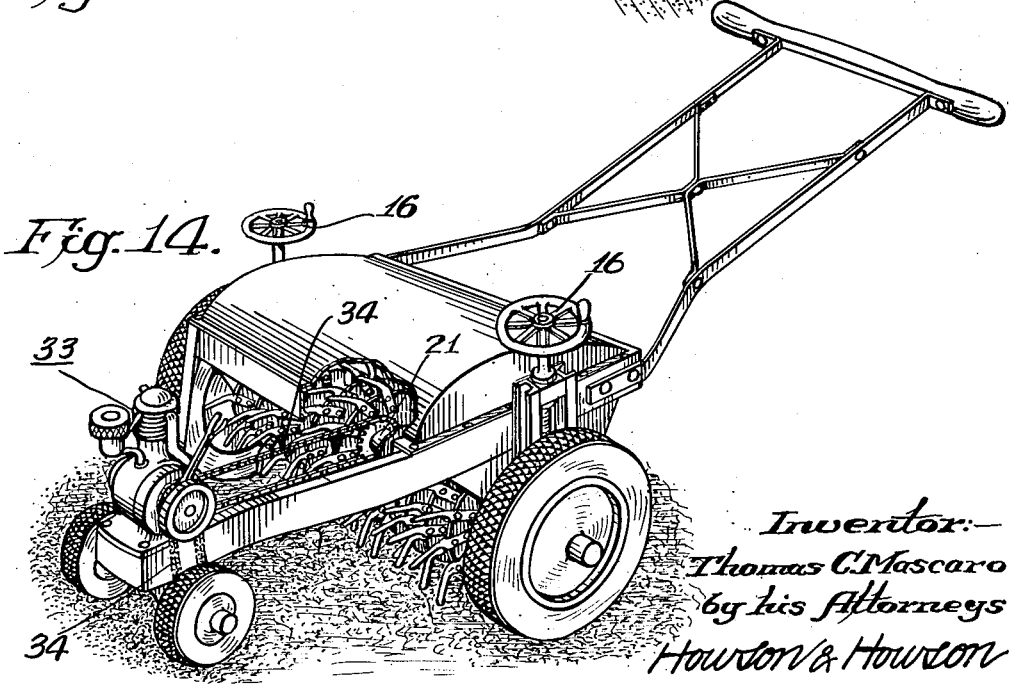

Inventor —
Thomas C. Mascaro
by his Attorneys
Howson & Howson

Patented Dec. 25, 1951

2,580,236

UNITED STATES PATENT OFFICE 2,580,236

TURF PENETRATING MACHINE AND ELEMENT THEREFOR

Thomas C. Mascaro, West Point, Pa., assignor of one-half to Anthony Mascaro, West Point, Pa.

Application October 9, 1947, Serial No. 778,775

17 Claims. (Cl. 97—52)

This invention relates to new and useful improvements in turf penetrating machine and elements therefor, and more particularly to devices designed to loosen and aerate the soil about the roots of grass turf with a minimum of disturbance to the surface grass, being a continuation-in-part of my application Serial No. 707,896 filed November 5, 1946, now abandoned.

In the maintenance and upkeep of grass surfaces such as lawns, athletic fields and particularly the greens and fairways of golf courses, it is desirable, if not absolutely necessary, periodically to open the soil surface to aerate the turf and to admit water as well as dressings such as chemicals and fertilizers. This treatment encourages deeper root penetration and tends to reduce the occurrence of brown patch and other afflictions of grass surfaces. In such treatment of grass surfaces it is highly desirable that the surface grass be subjected to a minimum of disturbance so that there is a minimum of interference with the use of the turf as a playing surface for golf or other sport as the case may be.

Prior to the present invention it has been proposed to aerate the grass surfaces of golf courses and other playing fields by the use of spikes, punches or the like which are adapted to form openings inwardly of the turf. These devices do not remove any of the soil and do not effectively loosen the soil because in entering the turf, the spikes or punches displace the soil laterally thereby compressing and compacting it about the spike or punch. This action not only does not loosen and open up the soil so that it more readily takes up the admitted air, moisture and soil dressings, but actually renders the soil surrounding the opening more impenetrable to the entrance of air, moisture and dressing materials.

With the foregoing in mind, the principal object of the present invention is to provide a device of the character described which embodies novel features of construction and arrangement operable effectively to cultivate the soil about the roots of grass turf with a minimum of disturbance of the surface grass.

Another object of the invention is to provide a device as set forth having novel means operable to remove small plugs of soil from the turf without tearing the sod thereby effectively forming openings in the turf and exposing the roots of the grass to air and moisture without compressing and compacting the soil adjacent and surrounding the opening formed.

Another object of the invention is to provide a device of the stated character having novel means as described which is operable to cultivate the turf in a manner permitting it to be used as a playing surface immediately upon completion of the cultivating operation, the effects of the treatment being scarcely visible if the turf is matted in the opposite direction from which aerated, and then rolled.

A further object of the invention is to provide apparatus of the type described having the features and characteristics set forth which is of relatively simplified and rugged construction, and completely efficient and effective in operation and use.

These and other objects of the invention and the various features and details of the construction and operation thereof are hereinafter fully set forth and described with reference to the accompanying drawings; in which:

Fig. 1 is a view in perspective of a cultivating apparatus embodying the present invention;

Fig. 2 is a sectional view taken on line 2—2, Fig. 1;

Fig. 3 is a fragmentary sectional view taken on line 3—3, Fig. 2;

Fig. 4 is a sectional view taken on line 4—4, Fig. 2;

Fig. 5 is an enlarged sectional view taken on line 5—5, Fig. 4;

Fig. 6 is an enlarged sectional view illustrating in greater detail an opening formed in turf by the present invention;

Figure 16:
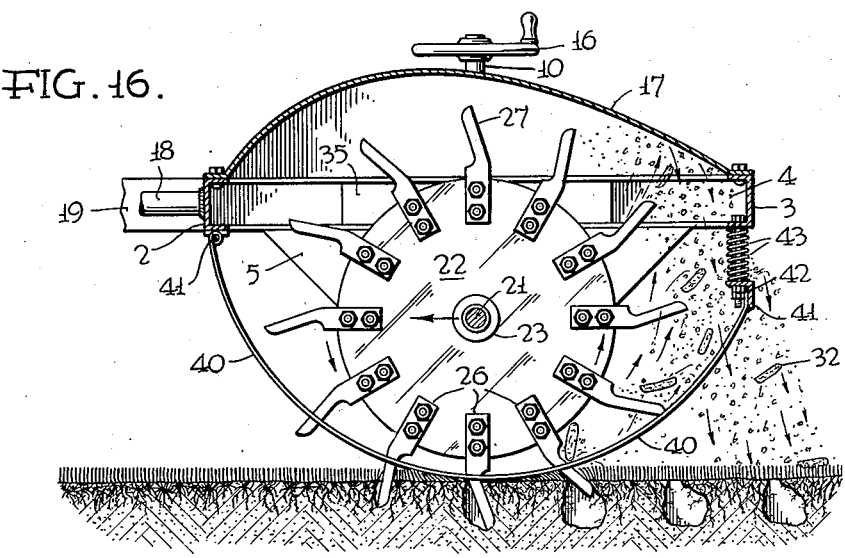

Figs. 7 to 12, inclusive, comprise a series of fragmentary views partially in section showing the manner in which the cultivating spoons of the apparatus enter and leave the turf to form an opening therein with a minimum of disturbance of the surface of the turf;

Fig. 13 is a view in perspective depicting the general shape and contour of a plug of soil removed from the turf by a cultivating spoon;

Fig. 14 is a view in perspective of a modified version of apparatus embodying the present invention;

Fig. 15 is a view in perspective of one of the spoon elements;

Fig. 16 is a side elevational view of apparatus made according to the invention and embodying novel means for preventing the tearing loose of a continuous surface layer of the turf being treated.

Figure 17:
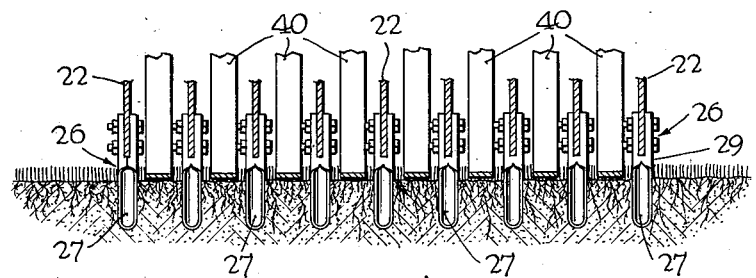

Fig. 17 is partial sectional view taken on line 17—17, Fig. 16.

Figure 18:
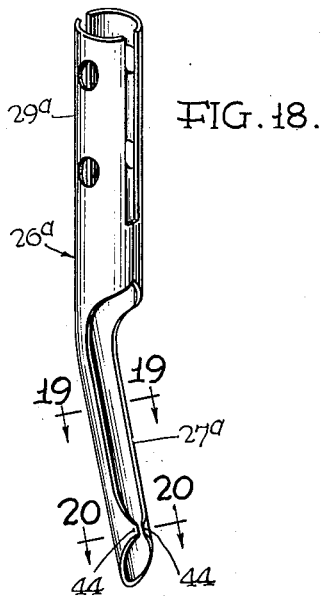

Fig. 18 is a perspective view of a modified form of cultivating spoon; and

Figure 19:
Figure 20:
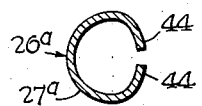

Figs. 19 and 20, respectively, are enlarged sectional views taken on lines 19—19 and 20—20, Fig. 18.

Referring now to the drawings, and particularly to Figs. 1 to 4 thereof, there is illustrated one form of apparatus made according to the present invention. As there shown, such apparatus may comprise a horizontally disposed generally rectangular frame structure 1 including front and rear frame elements 2 and 3, respectively and side or end elements 4—4, preferably of channel cross-section shape.

Secured to the underside of the side or end frame members 4—4 are vertically depending plates 5—5 of generally triangular configuration as best illustrated in Figs. 1 and 4. In addition to the plates 5—5 reinforcing plate members 6—6 are secured to the outer face of said plates and the side or end frame members 4—4, and to each of these plate members 6—6 is secured a pair of vertically arranged spaced apart channel members 7 and 8.

Fixedly secured intermediate the pairs of channel members 7 and 8 at the upper ends thereof are blocks or like members 9—9 in which suitable shafts 10—10 are rotatably mounted. Portions of the shafts 10—10 below their mounting plugs 9—9, are provided with threads as indicated at 11 to receive thereon suitable threaded members 12—12 which are slidable in a vertical direction intermediate the aforesaid pairs of spaced channels 7 and 8. The members 12—12 carry laterally projecting axle studs or trunnions 13—13 on which are rotatably mounted suitable traction wheels 14—14 equipped with pneumatic tires 15—15. Fixed on the upper ends of the shafts 10 are handwheels or the like 16—16 and it will be apparent that by rotating the latter in one direction or the other the shafts 10—10 will be correspondingly rotated to thereby effect adjustment of the vertical position of the members 12—12 with resulting raising or lowering of the wheels of the device with respect to the rectangular frame 1 of the apparatus.

The frame 1 of the apparatus preferably is provided with a hood or cover 17 which may be secured to the front, rear and side or end elements of the frame in the manner shown in the drawings. The apparatus may be pulled or drawn over the turf to be treated by an automobile, tractor or the like to which said apparatus may be connected through a draw-bar or the like 18 which projects forwardly from the front frame member 2 to which it may be secured, for example, by welding. The draw-bar may be reinforced by a generally V-shaped yoke 19 connected at its opposite ends to the front frame member 2 and having its central or apex portion embracing and secured to the draw-bar 18 in the manner shown in Figs. 1 and 4 of the drawings.

Secured to the inner faces of the side plates 5—5 and in axial alignment with respect to one another are collars 20—20 in which are rotatably journaled the opposite ends of a shaft 21 that extends horizontally and transversely of the apparatus beneath the frame 1 thereof. Mounted for free rotation upon the shaft 21 are a plurality of circular disk elements 22 having central hub portions 23 which are provided with sleeve bearings 24 that may be lubricated, for example, by grease or oil cups provided as indicated at 25. The circular disks 22 are arranged upon the shaft 21 with their hub portions 23 in endwise abutting relation as shown in Fig. 3 of the drawings.

Fixedly secured upon each of the circular disk elements 22 and adapted for rotation therewith about the shaft 21 is a plurality of turf-engaging elements or spoons, generally designated by reference numeral 26, and arranged substantially radially of the disks 22 at equally spaced intervals circumferentially thereof. The construction and arrangement of these elements or spoons 26 and the manner in which they enter and leave the turf to open and loosen the same constitutes an important feature of the present invention. With reference particularly to the construction and arrangement of the spoons 26 it is to be noted that the turf-engaging portion 27 thereof is elongated and of concave-convex construction having a uniform substantially semi-circular cross-sectional configuration throughout the length thereof as shown in Fig. 5 of the drawings with its free end rounded as indicated at 28. At their inner end the semi-circular portions 27 of the spoons 26 terminate in tubular portions 29 which may be slotted diametrically as is indicated at 30 to receive the peripheral edge portion of the circular disks 22 to which said spoons 26 are secured, for example, by nuts and bolts or other suitable fasteners 31.

The spoons 26 are mounted in such manner that the semi-circular portions 27 thereof engage the turf with the convex face of the semi-circular portion facing in the direction of travel of the apparatus and with the concave face thereof in trailing relation with respect to direction of travel of the apparatus, for example, as indicated most clearly in Figs. 7 to 11 of the drawings. Essentially, therefore, the diametrically extending slot 30 provided in the tubular mounting portion 29 of the spoon 26 lies in a plane normal to the plane of the trailing edges of the turf-engaging concave-convex portion 27 of said elements.

The several spoons 26 are mounted upon the circular disks 22 with their tubular portions 29 positioned radially with respect to the rotational axis of the shaft 21, and it is to be noted that the turf-engaging portions 27 thereof are disposed at a substantial angle to the tubular mounting portion 29 so that said portions 27 are positioned at an angle to the radius from the axis of rotation of the disks 22 whereby the said portions 21 lead slightly in the direction of rotation of the circular disks 22 as indicated by the arrows on the several figures of the drawing. The angular disposition of the spoon portions 27 with respect to the radii from the axis of rotation of the disks may vary widely and satisfactory results are obtained at angles of from about 5° to 30°. In the embodiment of the invention shown in the drawing, the soil engaging portions 27 are disposed at an angle $y$ (see Fig. 8) of about 30° to the radius drawn from the axis of disk rotation. The spoons or soil engaging elements 26 may be fabricated of carbon steel tubing cut away to provide the concave-convex portion 27 and preferably case hardened for durability.

The action of these elements or spoons 26 and the manner in which they enter and leave the turf is illustrated in Figs. 7 to 11, inclusive, of the drawings. Thus in Fig. 7 of the drawings and with the apparatus moving from right to left and the circular disks 22 rotating in the counterclockwise direction indicated, there is illustrated the relative position of the spoons with respect to the apparatus and the surface of the earth at the instant they are about to penetrate or enter the turf at a point indicated by line $x$—$x$. As traverse of the apparatus and rotation of the disk 22 continues in the direction mentioned, the portion 27 of the spoon 26 moves downwardly into the turf substantially in vertical alignment with the point of entry indicated by said line x—x as shown in Fig. 8, and then as traverse of the apparatus and rotation of the disk 22 continues further this portion 27 of the spoon 26 moves progressively rearwardly to undercut the surface of the turf rearwardly of the entrance point denoted by line x—x by a generally arcuate sweep of the spoon portion 27 which appears to take place about a center located substantially at the entrance into the turf as indicated in Figs. 9 and 10 of the drawings, the said semi-circular portion 27 then finally being withdrawn from the turf substantially at the point of original entry denoted by line x—x as shown in Fig. 11. As it emerges from the turf, the portion 27 of the spoons 26 carries with it an elongated generally cylindrical mass or plug 32 of the soil (see Fig. 13) thus leaving an opening in the turf of the general configuration shown in Figs. 6 and 12 of the drawings.

These small plugs or masses of soil 32 removed from the turf by the spoons 26, for the most part are thrown by the spoons upwardly against the underside of the cover or hood 17 which serves to break up the plugs or masses 32 into relatively small particles of earth that are scattered by gravity over the surface of the turf. If the turf is then matted in the opposite direction from which aerated, and then rolled, the effects of the treatment are scarcely visible so that the ground can be used immediately after treatment.

As previously stated, the frame members 2, 3 and 4 preferably are of channel cross-section shape, and this is preferred for the reason that there is thus provided suitable out-of-the way space in which may be detachably mounted suitable weights 35 of metal, concrete or the like as may be required in order to increase the weight of the apparatus depending upon the hardness of the turf so as to cause the spoons 26 to penetrate the same.

In the large sizes of the apparatus such as, for example, those used upon relatively coarse turf, it is desirable that the apparatus be drawn by a tractor or other vehicle in which the operator may ride and this is particularly true in cases where large areas of ground are required to be treated. On the other hand, in smaller, relatively lighter models of the apparatus such as may be used on finer grass turfs of small area, for example, golf greens, the apparatus may be made self-propelling by mounting thereon a gasoline engine or other source of motive power 33 and providing a driving connection such as a chain 34 between the power source and either one of the supporting wheels of the apparatus or the shaft 21 thereof as illustrated, for example, in the embodiment shown in Fig. 14 of the drawings.

In certain instances, and more particularly in the case of turf having a relatively shallow grass root structure, the lifting action or force of the spoons 26 as they emerge from the ground may tend to tear loose and raise the entire surface layer of the turf, for example, in the manner of a mat or blanket. This is undesirable, of course, and, in accordance with the present invention, the apparatus preferably is provided with novel means arranged to bear or engage upon the surface of the turf intermediate the rotating spoons 26 and thereby prevent a surface layer of the turf from being torn loose and lifted or raised upwardly as described.

Thus, with reference to Figs. 16 and 17 of the drawings, in the illustrated embodiment of the present invention, a plurality of bearing element or strips 40 is pivotally mounted at their forward ends upon a rod or shaft 41 which is secured transversely of the apparatus, for example, underlying the front cross-frame member 2 as shown. The bearing strips 40 are arranged in equally spaced apart relation transversely of the apparatus and disposed so that each strip extends rearwardly between an adjacent pair of the turf engaging spoons 26, for example, as best shown in Fig. 17.

The strips 40 are of generally arcuate configuration and have their rear ends permanently secured to a cross member 42 which extends transversely of the apparatus in underlying relation to the rear frame member 3. The cross member 42 is adjustably mounted with respect to the frame member 3, for example, by means of one or more bolt and nut assemblies 43 having an interposed spring 44 of adequate strength operable to oppose upward movement of the strips 40 and maintain them in contact with the surface of the turf under the desired pressure. By this construction, any tendency for the spoons 26 to tear loose a surface layer of the turf is eliminated.

In addition, in some uses of the apparatus a modified form of spoon may be indicated. Thus, for example, in the case of certain types of turf the small plugs of earth 32 may not be completely severed and removed from the ground, but merely turned over into the surface of the grass so that there is provided, in effect, a hinged closure or trap door above the hole or recess formed in the ground by the spoons 26. In such instances, in the event it is desired completely to sever the plugs from the turf, the form of spoon shown in Figs. 18, 19 and 20 of the drawings may be used with good results. The modified form of spoon is designated generally by the numeral 26a and, as shown, is generally similar in construction and arranged to the spoons 26 previously described herein, comprising tubular, mounting portions 29a which may be slotted diametrically as at 30a to receive the edge of the disks 22, and elongated turf engaging portions 27a of concave-convex substantially semi-circular cross-sectional configuration through the greater portion of the length thereof. This modified form of spoon 26a, however, differs from the spoons 26 in that while the turf engaging portions 27 of the spoons 26 are of substantially uniform cross-sectional shape throughout their entire length, the modified spoons 26a, at a point closely adjacent the free end or tip of the portions 27a, are provided with substantially circumferentially arranged arcuate wall extensions 45 on opposite sides of the turf engaging portions 27a, and these extensions 27a have their free edges disposed in closely spaced confronting relation to give the turf engaging portions 27a at that point a cross-sectional shape which conforms generally to a split ring or tube, for example, as illustrated in Fig. 20 of the drawings. By extending the sides of the spoon portion 27a inwardly substantially as shown in the drawings, a complete severance and removal of the plugs 32 from the turf is assured in cases where such treatment is desired.

From the foregoing, it will be observed that the cultivator of the present invention provides an apparatus which operates effectively to open and loosen the soil around the roots of the turf with a minimum of disturbance to the surface grass. Loosening of the sub-surface soil in the manner described encourages substantially deeper root penetration and, by removing soil from the turf, portions of the roots of the grass are left exposed (see Fig. 6) to derive the maximum benefit from the air, water, and dressing materials admitted to the opening left by removal of some of the soil. Furthermore, by forming aeration openings or holes in the turf by the removal of soil, as distinguished from mere soil displacement, the soil surrounding the holes or openings that are formed in the turf is not compacted or compressed with the result that air, water and dressing materials can readily penetrate the soil. The apparatus also may be used to advantage prior to seeding the turf. The depth of cultivation is easily regulated to suit individual needs by adjusting the hand wheels 16, 16 in the manner previously described.

As an example of the extent of soil turn-over and aeration accomplished by the apparatus of the present invention, it is pointed out that with a device equipped with nine of the discs 22 each having a diameter of eighteen inches and provided with twelve spoons 26, then eighteen square feet of turf surface will be cultivated during each revolution of the discs 22 and one-hundred and eight openings or holes will be formed therein. Therefore, with the depth of cultivation of the spoons 23 set so that the average weight of each plug or mass 32 of soil is one ounce, then there will be brought up in such an area of eighteen square feet a total of six and three-quarters pounds of soil, or approximately seven and one-half tons of soil per acre, yet after the aerated turf has been matted and rolled as described this large soil turn-over is scarcely visible and does not precluded immediate use of the ground in its intended manner.

While certain embodiments of the invention have been illustrated and described herein, it is not intended to limit the invention to such disclosure, and changes and modifications may be made therein and thereto within the scope of the following claims.

I claim:

1. In cultivating apparatus for aerating and treating grass turf including a wheeled carriage adapted to traverse turf to be cultivated, a plurality of soil engaging elements rotationally movable relative to said carriage and arranged to engage and penetrate the soil, said elements each including an elongated soil engaging portion of substantially uniform concavo-convex cross-sectional shape lengthwise thereof with the concave face of said portion facing in the direction of movement of said elements relative to the carriage.

2. In cultivating apparatus for aerating and treating grass turf including a wheeled carriage adapted to traverse turf to be cultivated, a plurality of soil engaging elements rotationally movable relative to the carriage and arranged to engage and penetrate the soil, said elements each including a mounting portion and an elongated soil engaging portion of uniform concavo-convex substantially semi-circular cross-sectional shape lengthwise thereof projecting in the direction of operative rotary movement thereof with the concave face of said portion facing in said direction of operative movement thereof.

3. In cultivating apparatus for aerating and treating grass turf including a wheeled carriage adapted to traverse turf to be cultivated and including a shaft supported horizontally and transversely of said carriage, a plurality of soil engaging elements rotationally mounted relative to said shaft and including a mounting portion and an elongated soil engaging portion of uniform concavo-convex substantially semi-circular cross-sectional shape lengthwise thereof projecting in the direction of operative movement of the elements with the concave face of said portion facing in said direction of operative movement thereof.

4. Cultivating apparatus for aerating and treating grass turf comprising a wheeled carriage adapted to traverse turf to be cultivated, a plurality of transversely spaced sets of a plurality of soil engaging elements rotationally movable relative to said carriage to cause said elements to engage and penetrate the soil, arcuate strip members extending in the direction of travel of the carriage between adjacent pairs of said transversely spaced sets of elements and arranged to bear upon the surface of the turf adjacent the locations engaged by said elements to prevent the latter from tearing loose a surface layer of the turf, means pivotally mounting one end of the strips to the carriage, and means adjustably mounting the other ends of said strip members as a unit relative to the carriage.

5. Cultivating apparatus for aerating and treating grass turf comprising a wheeled carriage adapted to traverse turf to be cultivated, a plurality of transversely spaced sets of a plurality of soil engaging elements rotationally movable relative to said carriage to cause said elements to engage and penetrate the soil, arcuate strip members extending in the direction of travel of the carriage between adjacent pairs of said transversely spaced sets of elements and arranged to bear upon the surface of the turf adjacent the locations engaged by said elements to prevent the latter from tearing loose a surface layer of the turf, means pivotally mounting one end of the strips to the carriage, means adjustably mounting the other ends of said strip members as a unit relative to the carriage, and resilient means normally urging said strip members into contact with the surface of the turf.

6. Cultivating apparatus having soil engaging elements as claimed in claim 2 wherein the elongated soil engaging portions of said elements are each disposed at an angle of about 5° to 30° to a radius from the center of rotation of the element and leading in the direction of rotation thereof.

7. In cultivating apparatus for aerating and treating grass turf including a wheeled carriage adapted to traverse turf to be cultivated, a plurality of soil engaging elements rotationally movable relative to said carriage and arranged to engage and penetrate the soil, said elements each including a narrow elongated soil engaging part having wall portions defining a longitudinally extending trough therein of substantially uniform cross-sectional shape throughout its length, facing in the direction of movement of the elements relative to the carriage and operable to engage and remove an elongated plug of soil from the turf without materially compressing the surrounding turf.

8. In cultivating apparatus for aerating and treating grass turf including a wheeled carriage adapted to traverse turf to be cultivated, a plurality of soil engaging elements rotationally movable relative to said carriage and arranged to engage and penetrate the soil, said elements each including a narrow elongated soil engaging part having wall portions defining a longitudinally extending trough therein of substantially uniform cross-sectional shape throughout its length, facing in the direction of movement of the elements relative to the carriage and operable to engage and remove an elongated plug of soil from the turf without materially compressing the surrounding turf, the said wall portions of the soil engaging part being of uniform thickness.

9. A soil engaging element for cultivating apparatus comprising a mounting portion and a narrow elongated soil engaging part having wall portions defining a longitudinally extending trough therein of substantially uniform cross-sectional shape throughout its length and operable to engage and remove an elongated plug of soil from the turf without materially compressing the surrounding turf, and the said mounting portion being slotted inwardly from its outer end in the plane longitudinally bi-secting the narrow elongated soil engaging part.

10. A soil engaging element for cultivating apparatus comprising a mounting portion and a narrow elongated soil engaging part having wall portions defining a longitudinally extending trough therein of substantially uniform cross-sectional shape throughout its length and operable to engage and remove an elongated plug of soil from the turf without materially compressing the surrounding turf, the said wall portions of the soil engaging part being of uniform thickness, and the said mounting portion being slotted inwardly from its outer end in the plane longitudinally bi-secting the narrow elongated soil engaging part.

11. A soil engaging element for cultivating apparatus comprising a mounting portion and a narrow elongated soil engaging part having wall portions defining a longitudinally extending trough therein of substantially uniform cross-sectional shape throughout its length and operable to engage and remove an elongated plug of soil from the turf without materially compressing the surrounding turf, the axis of the elongated soil engaging part of said element being disposed at an angle of about 150° to 170° with respect to the axis of the mounting portion of said elements with the trough of said soil engaging part facing in the direction of the angulation of said part, and the said mounting portion being slotted inwardly from its outer end in the plane longitudinally bi-secting the narrow elongated soil engaging part.

12. A soil engaging element for cultivating apparatus comprising a tubular mounting portion and an elongated soil penetrating portion projecting endwise from said mounting portion, said soil penetrating portion being of uniform concavo-convex substantially semi-circular cross-sectional shape lengthwise thereof, said tubular mounting portion being slotted inwardly from its outer end in a plane longitudinally bi-secting the said soil penetrating portion.

13. A soil engaging element for cultivating apparatus comprising a tubular mounting portion and an elongated soil penetrating portion of uniform concavo-convex substantially semi-circular cross-sectional shape lengthwise thereof projecting endwise from said mounting portion, said mounting portion being diametrically slotted inwardly from its outer end in a plane longitudinally bi-secting the said soil penetrating portion, and said soil engaging portion having its axis disposed at an angle of about 150° to 170° with respect to the axis of the mounting portion with the turf of said soil engaging portion facing in the direction of the angulation of said soil engaging portion.

14. In cultivating apparatus for aerating and treating grass turf including a wheeled carriage adapted to traverse the turf to be cultivated and having a plurality of disks perpendicular to the turf and rotatable relative to the carriage, a plurality of soil-engaging elements fixed on each disk and comprising a mounting portion secured to a disk and an elongated soil penetrating portion projecting endwise from said mounting portion outwardly from the periphery of the disk, said soil penetrating portion having walls defining a longitudinally extending trough therein of substantially uniform cross-sectional shape throughout its length and facing in the direction of movement of said elements relative to the carriage, and said mounting portion being slotted to receive the edge portion of a disk therein with said slot extending inwardly from the end of the mounting portion in a plane longitudinally bi-secting the said soil penetrating portion.

15. In cultivating apparatus for aerating and treating grass turf including a wheeled carriage adapted to traverse the turf to be cultivated and having a plurality of disks perpendicular to the turf and rotatable relative to the carriage, a plurality of soil-engaging elements fixed on each disk and comprising a mounting portion secured to a disk and an elongated soil penetrating portion projecting endwise from said mounting portion outwardly from the periphery of the disk, said soil penetrating portion being of substantially uniform concavo-convex cross-sectional shape lengthwise thereof with the concave face of said portion facing in the direction of movement of said elements relative to the carriage, and said mounting portion being slotted to receive the edge portion of a disk therein with said slot extending inwardly from the end of the mounting portion in a plane longitudinally bi-secting the said soil penetrating portion.

16. In cultivating apparatus for aerating and treating grass turf including a wheeled carriage adapted to traverse the turf to be cultivated and having a plurality of disks perpendicular to the turf and rotatable relative to the carriage, a plurality of soil-engaging elements fixed on each disk and comprising a mounting portion secured to a disk and an elongated soil penetrating portion projecting endwise from said mounting portion outwardly from the periphery of the disk, said soil penetrating portion being of substantially uniform concavo-convex semi-circular cross-sectional shape lengthwise thereof with the concave face of said portion facing in the direction of movement of said elements relative to the carriage, and said mounting portion being slotted to receive the edge portion of a disk therein with said slot extending inwardly from the end of the mounting portion in a plane longitudinally bi-secting the said soil penetrating portion.

17. Cultivating apparatus as claimed in claim 7 wherein the elongated soil engaging portions of said elements are each disposed at an angle of about 5° to 30° to a radius from the center of rotation of the element and leading in the direction of rotation thereof.

THOMAS C. MASCARO.

(References on following page)

REFERENCES CITED

The following references are of record in the file of this patent:

UNITED STATES PATENTS

| Number | Name | Date |
|---|---|---|
| 273,021 | Burr | Feb. 27, 1883 |
| 560,033 | Holzhauer | May 12, 1896 |
| 1,125,409 | Seaman | Jan. 19, 1915 |
| 1,572,431 | Hansen | Feb. 8, 1926 |
| 2,214,702 | Seaman | Sept. 10, 1940 |
| 2,267,943 | Ogg | Dec. 30, 1941 |
| 2,325,997 | Kelly et al. | Aug. 3, 1943 |
| 2,427,369 | Ruple | Sept. 16, 1947 |

FOREIGN PATENTS

| Number | Country | Date |
|---|---|---|
| 13,394 | Great Britain | Dec. 3, 1914 |
| 260,407 | Great Britain | Nov. 4, 1926 |